United States Patent [19]

Ko

[11] Patent Number: 5,287,190
[45] Date of Patent: Feb. 15, 1994

[54] POWER SWITCH FOR MULTIPLE OPERATING SECTIONS OF TELEVISION SET

[75] Inventor: Dong J. Ko, Suwon, Rep. of Korea

[73] Assignee: Samsung Electronics Co., Ltd., Suwon, Rep. of Korea

[21] Appl. No.: 969,579

[22] Filed: Oct. 30, 1992

[30] Foreign Application Priority Data

Oct. 30, 1991 [KR] Rep. of Korea .......... 91-19110

[51] Int. Cl.$^5$ .............................. H04N 5/63
[52] U.S. Cl. .......................... 348/730; 348/725
[58] Field of Search ............. 358/190, 165, 220; 390/720, 793; 315/411, 388, 243; H04N 5/63

[56] References Cited

U.S. PATENT DOCUMENTS

| | | | |
|---|---|---|---|
| 4,723,167 | 2/1988 | Griffey | 358/160 |
| 4,820,959 | 4/1989 | Griffey | 315/384 |
| 5,184,225 | 2/1993 | Heidebroek et al. | 358/243 |

Primary Examiner—Victor R. Kostak
Assistant Examiner—Nathan J. Flynn
Attorney, Agent, or Firm—Sughrue, Mion, Zinn, Macpeak & Seas

[57] ABSTRACT

A television power switch for preventing a picture transient phenomenon that is normally produced when the power to the television set is turned OFF. A microcomputer is used to generate a predetermined control signal when a user operates the power switch button. A power input/output section supplies and cuts off an AC power source in response to the control signal from the microcomputer. A mode selecting section converts the mode of a chroma IC between an OSD signal mode and a TV signal mode in response to the operating state of the power input/output section. The chroma IC enters the OSD signal mode when power is turned off, thereby preventing the picture transient phenomenon to be produced.

10 Claims, 2 Drawing Sheets

POWER SWITCH FOR MULTIPLE OPERATING SECTIONS OF TELEVISION SET

FIELD OF THE INVENTION

The present invention relates to a switch for a television set, and more particularly to a switch for preventing a picture transient phenomenon that is produced when the power to the television set is turned off.

Presently, television sets have a power plug for receiving external electric power. The power voltage supplied through this power plug is supplied to each operating section of the television set and cut off through the power switch. That is, the power voltage applied through the power plug is supplied to each operating section of the television set when a user turns on the power switch of the television set. When the user turns off the power switch the power voltage supplied to each operating section is cut off.

BACKGROUND OF THE INVENTION

FIG. 1 illustrates a conventional television power switch, comprising a microcomputer 10 for generating predetermined control signals and a transistor Q1 that is turned on or off by the control signals fed from the microprocessor. A relay RL supplies and cuts off the AC power to each operating section of the television set in accordance with the on or off state of the transistor Q1.

When a user turns on a power switch button (not shown) attached to the housing of the television set, the microcomputer 10 recognizes this and generates a high level signal. This high level signal is applied to the base of the transistor Q1, thereby turning on the transistor Q1. When the transistor Q1 is turned on, a current of more than a predetermined magnitude flows through the relay RL, thereby connecting the two contact points of the relay switch SW. This connection causes AC power to be supplied to each operating section of the television set. The relay RL operates such that when a current of more than a predetermined magnitude (approximately 80 mA) flows through the coil of the relay RL, the relay switch SW is connected and voltage is supplied through the power plug to each operating section. On the other hand, when a current under the predetermined magnitude flows through the coil of the relay, the relay switch SW is cut off.

More specifically, when the transistor Q1 is turned on by a high level control signal generated by the microcomputer 10, a current flows to the coil of the relay from a voltage source Vcc coupled to one end terminal of the coil of the relay RL, thereby connecting the switch SW, so that the AC power is supplied to each operating section. On the other hand, when a low level control signal is applied to a base terminal of the transistor Q1 and the transistor Q1 is turned off, the current does not flow to the coil of the relay RL. Accordingly, the switch SW is turned off and the AC power supply is cut off.

Thus, the conventional power switch only supplies or cuts off the power voltage applied from outside when a user turns on or off the power of the television set. In accordance with the television set provided with this conventional power switch, a predetermined picture transient phenomenon appears when the power is turned off. The picture transient phenomenon represents a particular color that instantaneously stands out in bold relief and is displayed on the screen when the set is turned off. The transient phenomenon may also represent an afterglow like a spark that remains on the screen and then disappears at the moment that the power is turned off. This picture transient phenomenon occurs because a video signal is instantaneously output even though the power supplied to the display section is cut off. This instantaneous power output causes the electron beam to be scattered by the cut off power when the power is turned off. Accordingly, the conventional television power switch only turns ON and OFF the outside power that is applied to each operating section. Thus, the power is cut off while the system is in a TV signal mode whereby a chroma IC outputs a TV video signal. Accordingly, the TV video signal output from the chroma IC is abnormally deflected when the external power is turned off, thereby producing the picture transient phenomenon.

SUMMARY OF THE INVENTION

The object of the present invention is to solve the above-noted problems, and to provide a power switching system that prevents the picture transient phenomenon. The picture transient phenomenon is prevented by converting a mode of the chroma IC from the aforementioned TV signal mode to an on screen display (OSD) mode when the power of the television set is turned off so as not to have a video signal fed from the chroma IC to the display section when power is turned off.

The above-noted object is accomplished by providing a power switch comprising: a power switch button for each operating section of a television, control means for generating a predetermined control signal for turning the power switch button ON or OFF and a power input/output section including a power input terminal receiving external power and an output terminal supplying power to each operating section of the television set. The input/output section supplies and cuts off power applied to the power input terminal through the output terminal in response to the control signal fed from the control means. The power switch also includes mode selecting means, coupled to the power input/output section for outputting a signal having a high or low level in accordance with the operating state of the power input/output section and a chroma IC which is converted to an OSD mode or a TV signal mode in response to the high or low level signal fed from the mode selecting means.

DETAILED DESCRIPTION OF THE PREFERRED EMBODIMENT

Hereinafter, a preferred embodiment of the present invention will be described in detail with reference to the accompanying drawings.

Figure 1:
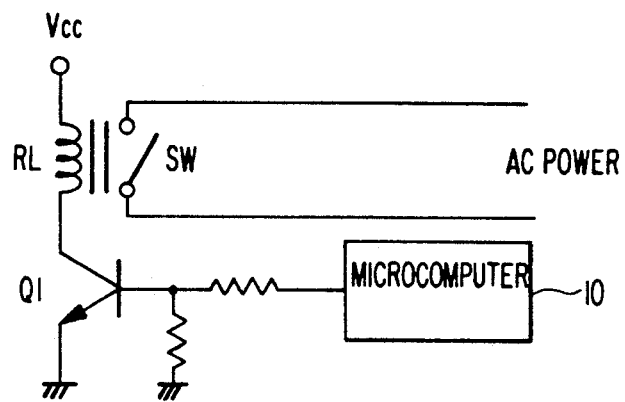
FIG. 1 is a circuit diagram showing an example of a conventional television power switch.
Figure 2:
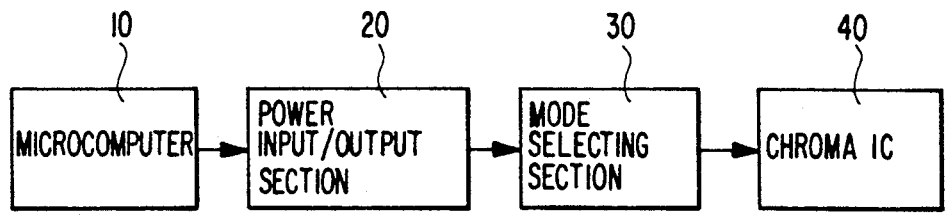
FIG. 2 is a block diagram showing a preferred embodiment of a television power switch in accordance with the present invention.

FIG. 2 is a block diagram showing a television power switch in accordance with the present invention. The power switch of FIG. 2 comprises a microcomputer 10 which monitors operation of the power switch button and outputs predetermined control signals. A power input/output section 20 which supplies and cuts off the external power voltage in response to control signals from the microcomputer. A mode selecting section 30 which selects a mode of the chroma IC unit 40 in accordance with the operating state of the power input/output section 20.

Figure 3:
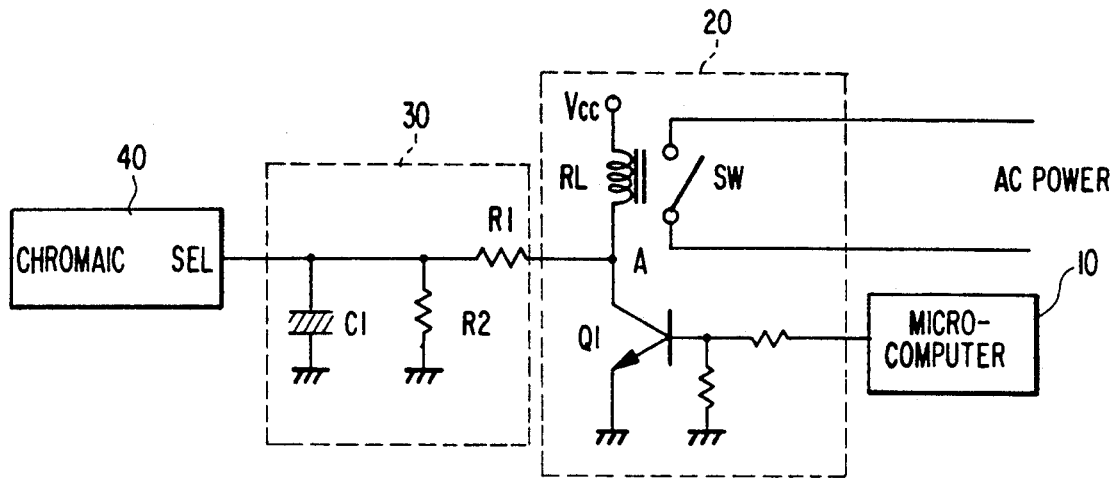
FIG. 3 is a detailed circuit diagram of FIG. 2.
Figure 4A:
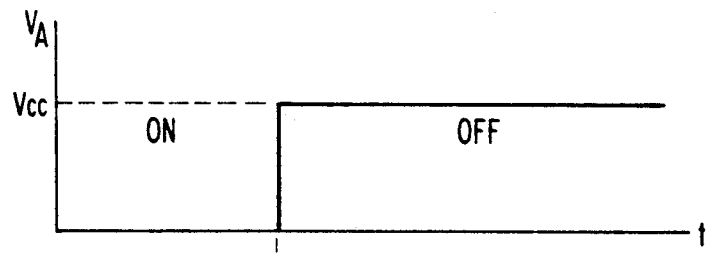
FIG. 4A and FIG. 4B are wave form charts for describing the operation of the circuit of FIG. 3.
Figure 4B:
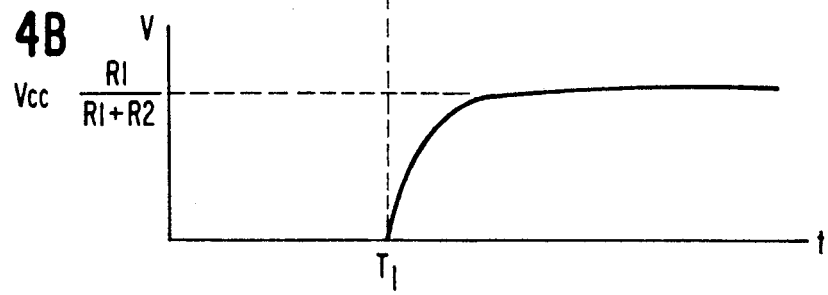

FIG. 3 is a circuit diagram showing detailed circuitry of the power input/output section 20 and the mode selecting section 30 in the power switch of FIG. 2. FIG. 4A and FIG. 4B are timing charts for the essential portions of the circuit diagram of FIG. 3. The operation of the circuit of FIG. 3 will now be described with reference to the timing charts of FIG. 4A and FIG. 4B.

When the power switch button is in an ON state, set by a user, the microcomputer 10 applies a high level signal to a base terminal of a transistor Q1, thereby turning the transistor Q1 to an ON state. When the transistor Q1 is in the ON state, a DC voltage Vcc is supplied to a relay RL and current flows through a coil of the relay and to ground through the transistor Q1. Current flowing through the coil of the relay RL causes the terminals of the switch SW to be connected. Accordingly, the externally supplied AC power is supplied to each operating section of the television set.

When a user turns the power switch button to an OFF state, the microcomputer 10 generates a low level signal, thereby turning the transistor Q1 to an OFF state. Turning off the transistor Q1 halts current flow to the coil of the relay RL, thereby opening the switch SW and cutting off the AC power to each section of the television set. When the power switch is opened at time T1, a potential at a collector terminal A of the transistor Q1 is raised to "Vcc" (as shown in FIG. 4A). Thus, the voltage "Vcc", applied to one terminal of the coil of the relay RL, is maintained continuously by an external AC power at the power plug.

The voltage Vcc at the collector terminal of the transistor Q1 is supplied to the mode selecting section 30. While the voltage Vcc is maintained at the collector terminal, a capacitor C1 in the mode selecting section 30 is charged by a predetermined voltage until a magnitude of this voltage reaches "Vcc·[R1/(R1+R2)]". This predetermined voltage magnitude is determined by the two resistors R1, R2 which form a voltage division circuit. Accordingly, the voltage "Vcc·[R1/(R1+R2)]" is applied to the mode selecting terminal SEL of the chroma IC unit 40.

When a low level signal is applied to the mode selecting terminal SEL, the chroma IC unit 40 enters the TV signal mode and feeds the TV video signal to the display section. When a high level signal is applied to the mode selecting terminal SEL, the chroma IC unit 40 enters the OSD mode. When in the OSD mode, the chroma IC unit 40 supplies an OSD signal to the display section.

Since the predetermined voltage magnitude of Vcc·[R1/(R1+R2)] is continuously supplied to the selecting terminal SEL of the chroma IC unit 40 by the capacitor C1 when power is turned off, the chroma IC unit 40 maintains the OSD mode after the user turns off the power switch button. Thus, since the chroma IC 40 maintains the OSD signal mode after power is turned off, the TV video signal is not transmitted to the display section when power is turned off, and accordingly the aforementioned picture transient phenomenon is not produced.

As described above, the television power switch in accordance with the present invention converts the mode of the chroma unit IC from the TV signal mode to the OSD signal mode when power is turned off and prevents the TV video signal from being fed to the display section, thereby preventing the picture transient phenomenon when power is turned off. Thus, since the picture transient phenomenon is prevented, the cathode ray tube is not affected and the user is given a stable sense of reliability for the product.

What is claimed is:

1. A power switch for supplying and cutting off power to multiple operating sections of a television set in accordance with ON and OFF operating states of a power switch button of the television set, said power switch comprising:

control means for generating a predetermined control signal according to an operating state of the power switch button;

a power input/output section having a power input terminal for receiving external power and a power output terminal for supplying said external power to each operating section of the television set, said power input/output section changing operating states to supply and cut off the external power supplied through said output terminal in response to said control signal from said control means;

mode selecting means, coupled with said power input/output section, for outputting predetermined high and low level signals in accordance with the operating state of the input/output section; and a chroma IC which is converted between an OSD mode and a TV signal mode in response to a level of said predetermined signal output by said mode selecting means.

2. A power switch as defined in claim 1, wherein said power input/output section includes:

a transistor connected between said control and mode selecting means, said transistor being converted between ON and OFF states by the control signal from said control means; and switch means for outputting and cutting off said external power applied through said power terminal in accordance with the state of said transistor.

3. A power switch as defined in claim 1, wherein said mode selecting means includes:

a capacitor which charges to a voltage having a predetermined magnitude when said power input/output section cuts off external power.

4. A power switch as defined in claim 3, wherein said mode selecting means applies said voltage charged across said capacitor to a mode selecting terminal of said chroma IC.

5. A power switch as defined in claim 2, wherein said switch means includes:

a coil having one terminal connected to a constant DC voltage source and another terminal coupled to a collector terminal of said transistor; and a switch having a first switch terminal connected with said power input terminal and a second switch terminal connected with said power output terminal;

wherein said first and second switch terminals are connected when a current exceeding a predetermined magnitude flows through said coil, and are disconnected when a current below said predetermined magnitude flows through said coil.

6. A power switch as defined in claim 4, wherein said capacitor is charged by the current applied through said coil of said switch means.

7. A power switch as defined in claim 5, wherein said mode selecting means includes a capacitor that is charged by the current applied through said coil of said switch means.

8. A power switch as defined in claim 6, wherein said capacitor of said mode selecting means is charged by a voltage of predetermined magnitude when the transistor of said power input/output section is in an off state.

9. A power switch as defined in claim 7, wherein said capacitor of said mode selecting means is charged by a voltage of predetermined magnitude when the transistor of said power input/output section is in an off state.

10. A power switch as defined in claim 4, wherein said chroma IC is converted to the OSD signal mode when a high level signal is applied to said mode selecting terminal, and is converted to the TV signal mode when a low level signal is applied thereto.

* * * * *